(12) United States Patent
Arocena De La Rua et al.

(10) Patent No.: US 10,746,161 B2
(45) Date of Patent: Aug. 18, 2020

(54) LIGHTNING TRANSMISSION DEVICE BETWEEN THE ROTOR AND THE NACELLE IN A WIND TURBINE

(71) Applicant: GAMESA INNOVATION & TECHNOLOGY, S.L., Sarriguren (Navarra) (ES)

(72) Inventors: Ion Arocena De La Rua, Sarriguren (ES); Ignacio Azcona Perez, Sarriguren (ES); Irune Moriana Garcia, Sarriguren (ES); Victor March Nomen, Sarriguren (ES)

(73) Assignee: SIEMENS GAMESA RENEWABLE ENERGY INNOVATION & TECHNOLOGY, S.L., Sarriguren (ES)

( * ) Notice: Subject to any disclaimer, the term of this patent is extended or adjusted under 35 U.S.C. 154(b) by 1083 days.

(21) Appl. No.: 15/200,070

(22) Filed: Jul. 1, 2016

(65) Prior Publication Data

US 2017/0030336 A1 Feb. 2, 2017

(30) Foreign Application Priority Data

Jul. 31, 2015 (ES) .................................. 201500573

(51) Int. Cl.
*F03D 80/30* (2016.01)
*H02K 7/18* (2006.01)

(52) U.S. Cl.
CPC ........... *F03D 80/30* (2016.05); *H02K 7/1838* (2013.01); *F05B 2220/32* (2013.01); *Y02E 10/725* (2013.01)

(58) Field of Classification Search
CPC ....... F03D 80/30; F03D 80/00; H02K 7/1838; H02K 7/183; H01H 47/00
USPC ......................................................... 361/220
See application file for complete search history.

(56) References Cited

U.S. PATENT DOCUMENTS 8,081,414 B2 * 12/2011 Llorente Gonzalez ...................... F03D 1/065
361/220

FOREIGN PATENT DOCUMENTS

EP    1 930 586 A1    6/2008
ES    2 265 776 A1    2/2007

\* cited by examiner

*Primary Examiner* — Woody A Lee, Jr.
*Assistant Examiner* — Michael L Sehn
(74) *Attorney, Agent, or Firm* — Ladas & Parry LLP

(57) ABSTRACT

A lightning transmission device between the rotor and the nacelle in a wind turbine, which comprises: a first electricity conductor platen, where one of its ends is separated at a distance with respect to a metal strip located at a root of each blade; a second electricity conductor platen, where one of the ends is separated a distance with respect to a gutter element; an electrical conductor between the first and second platen; an electrical insulator coupled to said first and second platens; which is also coupled to the hub of the wind turbine; and a relative displacement unit between the first and second platen, the unit configured to ensure a predefined distance between the end of the first platen and the metal strip; and between the end of the second platen and the gutter element.

11 Claims, 3 Drawing Sheets

LIGHTNING TRANSMISSION DEVICE BETWEEN THE ROTOR AND THE NACELLE IN A WIND TURBINE

TECHNICAL FIELD OF THE INVENTION

The present invention relates to a lightning transmission device between the rotor and the nacelle, configured to be installed in a wind turbine, and to the associated installation procedure; which are located in the industry of renewable energies of wind type, as well as in the management and electrical conduction of lightning caused by thunderstorms toward ground.

The lightning transmission device object of invention has as primary aim to protect the sensitive parts of the wind turbine from over-currents in their main entities, which originate through lightning that can fall on said wind turbine, which run part of it to reach ground. This protection is performed thanks to a simple, versatile lightning transmission device, with an optimum installation facility for the so diverse conditions existing in the location of each wind turbine, and that ensures the adequate transmission of electric current, from the rotor of the wind turbine to the nacelle, from the wind turbine (without running through the blade bearing, hub and rest of the power train of the wind turbine) and from it to ground, of safely and effectively.

BACKGROUND OF THE INVENTION

By way of introduction, it is known that there is a variety of locations of wind turbines used for the transformation of wind energy into electric power, which are located in strategic areas unprotected from physical obstacles for the purpose of maximising wind energy, for instance, hilltops, offshore areas, etc.

This location in exposed areas and the itself geometry of wind turbines, which corresponds to a pole anchored on its basis to the ground, and in the upper part has a hub from where leave three or more blades of aerodynamic profile; it makes that the probability of attracting lightning is high and, once the lightning reaches the wind turbine, a high-magnitude current runs through it, that can impair the inner components of the wind turbine, with the subsequent damage for the energy supplying company, and the risk involved for the operators from replacing said impaired parts in position situ according to the extreme locations of the wind turbines. The most critical point of lightning transmission to ground occurs when the lightning falls on the moving blades and the lightning must be transferred to the nacelle of the wind turbine that remains static, so a binding element must be positioned between the moving blades and the static nacelle, which transmits said lightning to ground and does not affect the normal blade performance.

To solve this problem, a system protecting the components of the wind turbine against lightning strikes is known, which consists of directing discharge from the blade tip or blade to ground, using first an internal wire joining the blade tip, supported on the internal stiffening beam of the blade to subsequently lead this electrical current to the hub through the blade bearing and from there to the low speed shaft. Then the frame is reached through the bearings and, finally, crossing the slewing ring joining the frame to the tower, the discharge is taken to the ground. However, this solution shows the major disadvantage that the lightning discharged by this way damages the bearings and discharge train, so alternative solutions have been searched for.

With this regard, to be noted is the patent application also of this applicant, under publication number ES-2265776, which describes a lightning transmission device, which is formed by a conduction bar fixed to a second insulating bar, and fixed to a wind turbine hub. Therefore, a first end of the lightning transmission device is in front of a metal strip located at the root of each blade of the wind turbine at a first distance which allows an electric jump of a lightning incident on a blade tip of the wind turbine, while a second end is in front of a gutter of a nacelle of the wind turbine at a second distance which allows the electric jump of the lightning. Therefore, the lightning runs from the blade tip at which it is incident thereon to the ground, through a number of conduction means including the lightning transmission device, said means preventing the lightning from affecting the sensitive parts of the wind turbine.

This solution ensures the non-impairment of the main components of the wind turbine, but shows an inconvenience related mainly to the assembly and installation of said lightning transmission device with respect to the blade and the gutter; as for the lightning transmission onto the ground to be performed optimally, predefined, specific distances must be ensured between the ends of the conductor bar and the blade strip and the gutter, respectively, without direct contact between them; for this, the transmission device must be placed with a lot of precision, as if the distance between the metal strip of the blade and the end of the bar, or between the other end of the bar and the gutter is excessive, the tension required for the electrical arc to be triggered increases between them and can stop working adequately, and the arc will jump to other metal elements close to the wind turbine, with the subsequent problem involved by this. This distance is also affected by the factory tolerances of the blade and the gutter.

It must be noted that there are also lightning transmission devices with direct contact between the blade (turning over its shaft and also turning with the hub) and the gutter (static), but these generate welding problems when a high current runs through it, generating excessive noises due to rubbing between components, in addition to requiring frequent maintenance due to wear for the friction between mobile and fixed parts.

Therefore, given the existent inconveniences during assembly and guarantee of the predefined distances for the electric arc to jump between the metal strip of the blade, the conductor bar, and the gutter, a new lightning transmission device is necessary to be installed in any type of wind turbine, which enables adaptability to the variability in the distances existing between the metal strips of the blades and the gutter element, and ensuring at all times the adequate electrical conduction between both elements when a lightning reaches the structure of the wind turbine through the respective blades thereof; and all of this with a simple transmission device, easy to install and maintain, and economically competitive with respect to the state of the art known to date.

DESCRIPTION OF THE INVENTION

This invention relates to a lightning transmission device between the rotor and the nacelle of the wind turbine, configured to be installed in a blade wind turbine turning with respect to a hub, wherein said wind turbine comprises additionally a gutter element, so that the transmission device comprises the following main entities:

A first electricity conductor platen, wherein one of its ends is separated at a distance from a metal strip placed at a root of each blade;

a second electricity conductor platen, where one of the ends is separated at a distance from the gutter element of said wind turbine;

electricity conductor means between the first and second platen;

an electrical insulator coupled to said first and second conductor platens, wherein said insulator is coupled also to the hub of said wind turbine, and relative displacement means between the first and second platen, said means configured to ensure a predefined distance between the end of the first platen and the metal strip located at the root of each blade; and between the end of the second platen and the gutter element.

It must be clarified that the distance of separation between one of the ends of the first platen and the metal strip located at a root of each blade; and the distance of separation between one of the ends of the second platen and the gutter element of said wind turbine; it is that ensuring the creation of an electric arc sufficient for the electrical current to run from the metal strip to the gutter element through both platens.

It must be also clarified that the concept of platens relates to any type of metal part of markedly rectangular geometry and with a reduced thickness, and its variable section can be circular, of bar type, or rectangular, of prism type, etc.

Given the main entities of the transmission device, the following novelties are seen with respect to the existing state of the art, and in particular based on the lightning transmission device described in the patent application under publication number ES-2265776; as in the transmission device object of invention, it is described the existence of two platens connected electrically to each other thanks to electricity conduction means; therefore, as the number of conductors are made independent in two platens, the location of the first end of the first platen can be positioned with precision with respect to a metal strip located at a root of each blade; and the second end of the second platen with respect to the gutter element. Therefore, an exact distance can be kept at all times between the elements which are part of the electrical path of the current from the electrical lightning, ensuring that the electrical arc circulates where it is intended, until it reaches ground through the gutter described.

In addition, it is described that both platens are coupled directly or indirectly to an electrical insulator, which is also coupled again directly or indirectly to the hub of the relevant wind turbine. Therefore, the electrical insulator ensures the impediment of the current running from the first platen to the hub, preventing impairment of the bearings and other mobile elements of said wind turbine.

With regard to the relative displacement means between the first and second platen, remembering that they are configured to ensure a predefined distance between the end of the first platen and the metal strip located at the root of each blade; and between the end of the second platen and a gutter element, two preferred possibilities of embodiment are considered;

A) The first embodiment describes the possibility that the relative displacement means between the platens comprise:
An oblong groove belonging to the second platen, and,
at least a hole belonging to the first platen, which is located internally with respect to the projection of the oblong groove of the second platen over the first platen; and wherein at least a fixation is coupled respectively to the groove and the hole, enabling to modify the relative position between the two platens based on the length of said groove.

It is seen that the oblong groove of the second platen ensures that the distance between the end of the two platens can be modified, which is directly related to the length of the oblong groove, an easy, versatile solution for each type of installation, and a procedure of installation of the lightning transmission device can be described, which comprises the following stages:

a) Positioning the first platen at a given distance from the metal strip located at the root of each blade;

b) Positioning the second platen at a given distance from the gutter element of said wind turbine;

c) fixing, through said, at least one, fixation, both platens through the overlapping of part of the first platen with respect to the second platen, through the oblong groove of the second platen and said, at least one, groove of the first platen.

It must be noted that in said alternative of embodiment, the electricity conductor means between the first and second platen are the platens, as they are in contact with each other thanks to, at least one, fixation.

Furthermore, for the purpose of subsequently positioning both platens with respect to the electrical insulator the possibility wherein the first platen shows tear configured to enable fixation of said platen with respect to a support, in turn coupled to the electrical insulator; and the second platen from a tear also configured to allow fixation of said platen with respect to the support.

Again, this fixation embodiment is associated with a procedure of installation of the lightning transmission device object of the invention, which comprises the following stages:

d) fixing, through a first fixation element, the first platen with respect to the support through the corresponding tear of said first platen; and e) fixing, through a second fixation element, the second platen with respect to the support through the corresponding tear of said second platen.

Therefore, to ensure the entire installation and exact location of the transmission device in this first alternative, it is necessary to fix, on one side, the distances between the conductor elements of the metal strip and the gutter with respect to the ends of the first and second platen, to subsequently, on the other side, to fix both with respect to the support coupled to the electrical insulator.

B) The second embodiment describes the possibility that the relative displacement means between the two platens comprise:

A first elastic spring coupled on one side to the first platen and on the other side to the insulator;

A second elastic spring coupled on one side to the second platen, and on the other side to the insulator;

an electrical conductor wire coupled both to the first platen and to the second platen, and where in each end of each platen closest to the metal strip and to the gutter, respectively, two insulating elements are positioned, configured to contact in this metal strip and the gutter, respectively, thanks to the elastic strength of both elastic springs; and said insulating elements being configured to avoid contact between the ends of the platens and the metal strip and the gutter element, respectively.

Significant differences are seen with respect to the first alternative of embodiment of the displacement means, as in this case no fixations or oblong grooves are considered to define the exact distance between the end of the first platen and the metal strip of the blade, and between the end of the second platen and the gutter; as in this second alternative the insulators associated with said platens also contact said metal strip and the gutter, respectively, and then can ensure at all times the exact distance to achieve the desired electrical arc.

With this regard, concerning said second alternative, a procedure of installation of the lightning transmission device is described, which comprises the following stages:
a) Fixing an end of the first platen at a predefined distance from each other of the insulating elements, said end being embedded with respect to the insulating element;
b) fixing an end of the second platen at a predefined distance from each other of the insulating elements said end being embedded with respect to the insulating element;
c) fixing the respective elastic springs to each end of each platen opposite the respective insulating elements;
d) coupling the elastic springs to the electrical insulator;
e) joining each platen through the electrical conductor wire; and
f) positioning the transmission element between the metal strip of the root of each blade and the gutter element of said wind turbine, until contacting one of the insulating elements with said metal strip and the other insulating element with the gutter element, due to the elastic springs associated with the platens fixed to said insulating element.

It is seen that in this second alternative there is permanent contact between the insulating elements and the relevant metal strip of the blade and the gutter; therefore, there can be a wear of said insulating elements requiring more frequent periodic maintenance than in relation to the first alternative; but as advantage over it it is seen that the distance between the ends of the platens and the metal strip of the blade and the gutter is always constant, as it is predefined in stages a) and b) of the associated procedure. On the other hand, as there is no direct contact between the platens and the blade metal strip and the gutter, respectively, no welding points will be produced when running the lightning, which does occur with the systems based on direct contact. Finally, the insulating material is selected to have a high resistance to abrasion and a low friction coefficient, to reduce possible noise and wear.

Finally, with regard to both alternatives of embodiment, it describes the preferred option wherein the electrical insulator is coupled to the hub of the wind turbine through a base that shows relative displacement means between the electrical insulator and the hub of the wind turbine. It allows a higher flexibility of installation for the purpose of absorbing errors of geometry or installation of the elements adjacent to the lightning transmission device object of the invention.

These displacement means can comprise a plurality of oblong grooves configured to enable coupling between said base and the hub through the respective fixation means; wherein said oblong grooves are positioned in the same direction of regulation in height of the lightning transmission device; therefore, a procedure is described for regulation in height of the lightning transmission device, which comprises coupling the electrical insulator with respect to the hub of the wind turbine, through the relative displacement means between both elements mentioned above.

Therefore, with the proposed invention a lightning transmission device is obtained which is able to protect the wind turbine from overcurrent in its main entities and caused by atmospheric lightnings that can fall on this wind turbine, thanks to an easy, versatile lightning transmission device that is easy to install for the so diverse conditions existing at the site of each wind turbine and ensures the adequate transmission of the electrical current from the origin to ground safely and effectively.

DESCRIPTION OF THE DRAWINGS

To complete the description being made, and in order to aid for a better understanding of the characteristics of the invention according to a preferred example of a practical embodiment thereof, a set of drawings are provided that form an integral part of this description where, for purposes of illustration and in a non-limiting sense, the following is shown.

PREFERRED EMBODIMENT OF THE INVENTION

Figure 1:
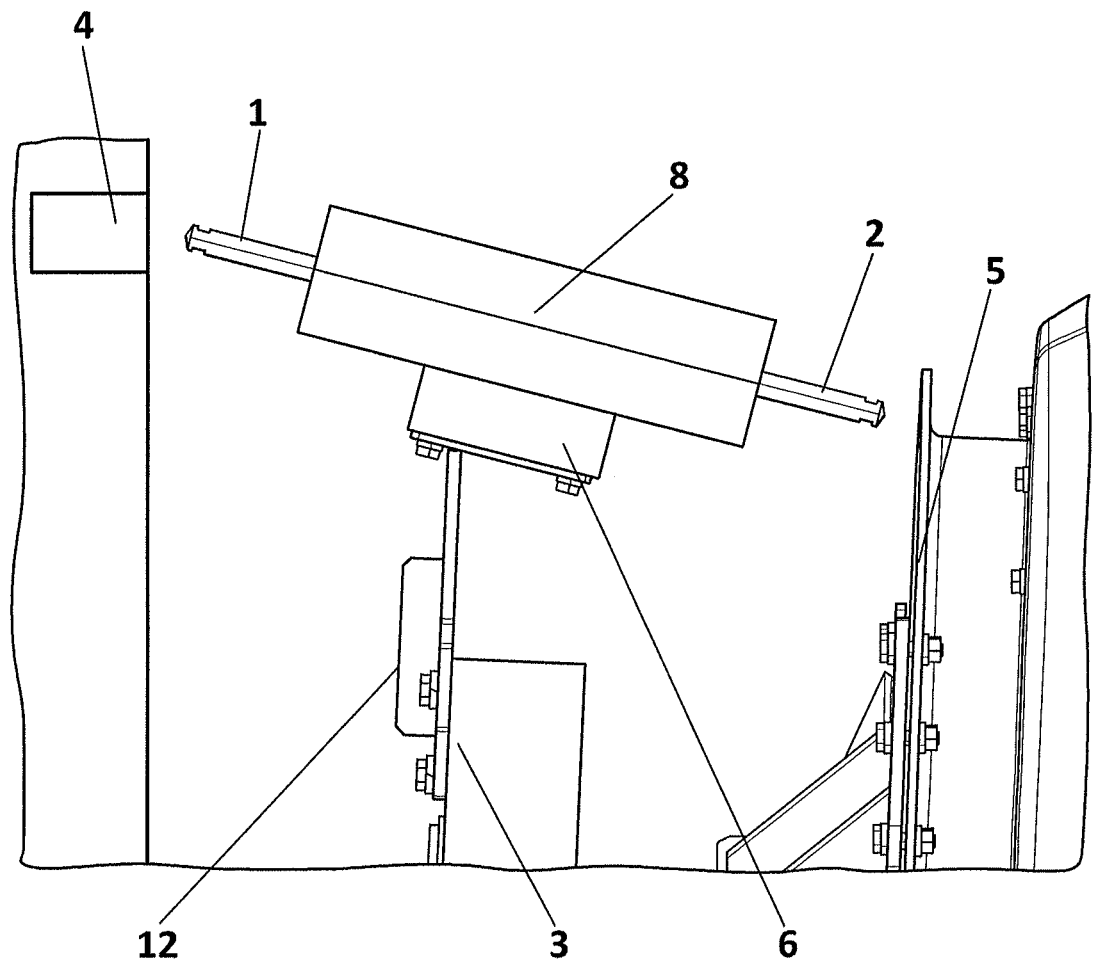
FIG. 1.—It shows a three-dimension view of the lightning transmission device object of the invention, in its first alternative of embodiment without elastic springs.
Figure 2:
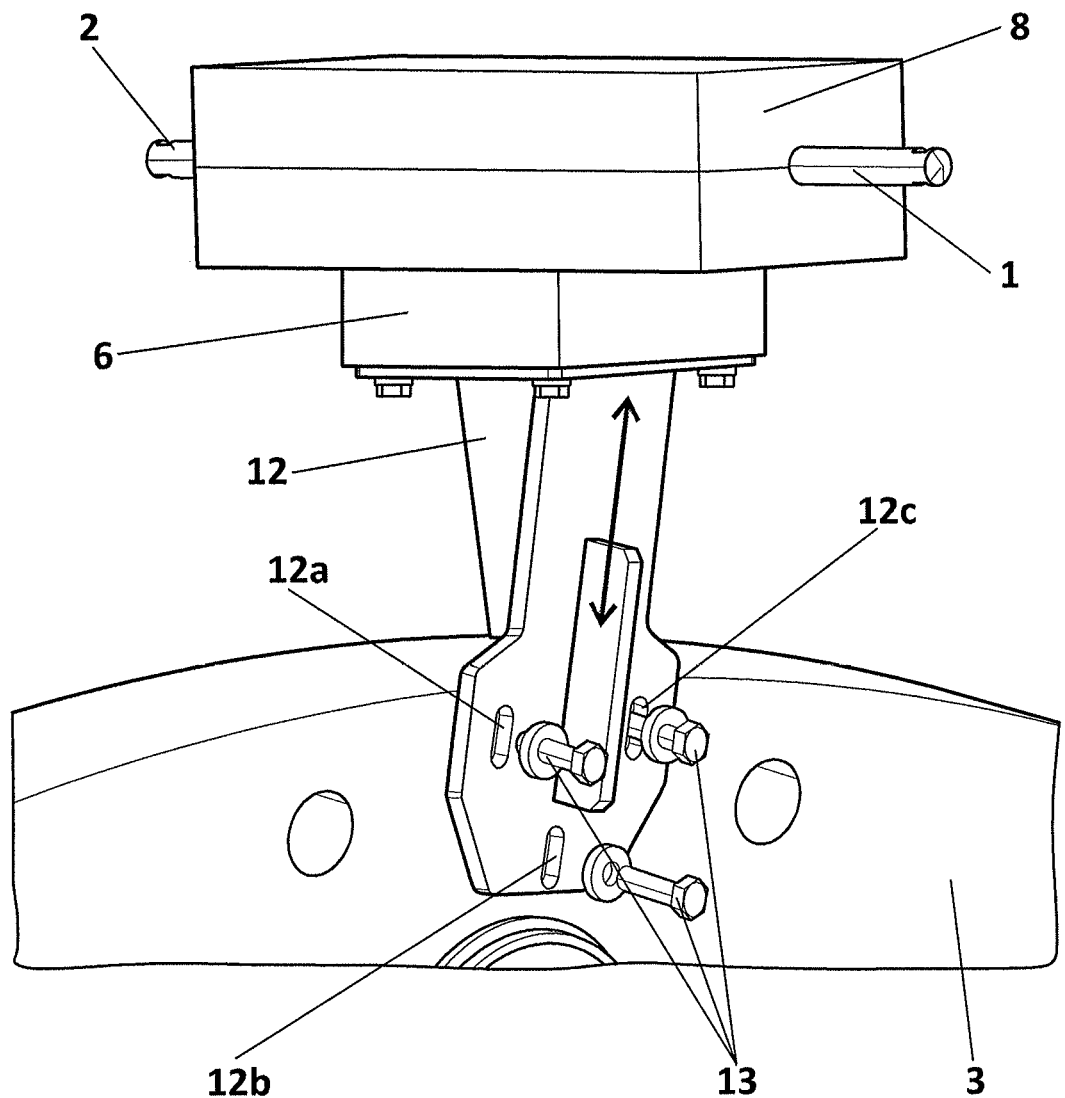
FIG. 2.—It shows a three-dimension view of the lightning transmission device object of the invention, with reference to the base that shows the relative displacement means between the electrical insulator and the hub of the wind turbine.

Given FIGS. 1 and 2, the lightning transmission device object of the invention can be seen as configured to be installed in a wind turbine of blades turning with respect to a hub (3), wherein said wind turbine comprises also a gutter element (5), and where said transmission device comprises:
A first electricity conductor platen (1), wherein one of its ends is separated at a distance from a metal strip (4) placed at a root of each blade;
A second electricity conductor platen (2), wherein one of the ends is separated at a distance from the gutter element (5) of said wind turbine;
electricity conductor means between the first and second platen (2) based on the type of alternative of embodiment selected;
an electrical insulator (6) coupled to said first and second conductor platens (2), where said insulator (6) is coupled also to the hub (3) of said wind turbine;
the electrical insulator (6) is coupled to the hub (3) of the wind turbine through a base (12) that shows relative displacement means between the electrical insulator (6) and the hub (3) of the wind turbine; which show three oblong grooves (12a, 12b, 12c) configured to allow coupling between said base and the hub (3) through the respective fixation means (13) of screw type; and
relative displacement means between the first and second platen (2), said means configured to ensure a predefined distance between the end of the first platen (1) and the metal strip (4) located at the root of each blade; and between the end of the second platen (2) and the gutter element (5), where said displacement means are associated with both alternatives of embodiment mentioned above and explained below.

Figure 3:
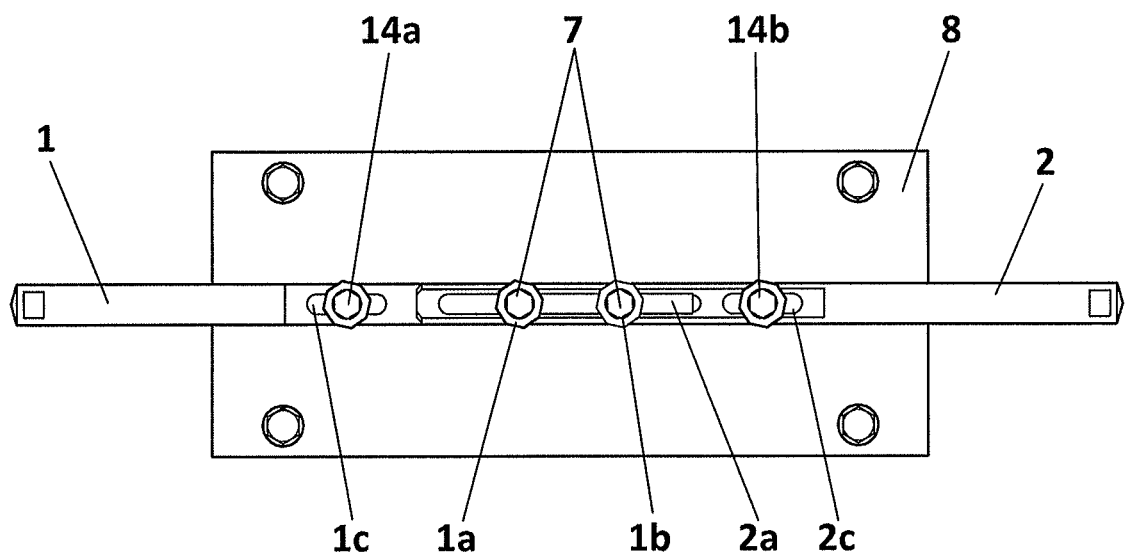
FIG. 3.—It shows a two-dimension view from above of the detail of joining between the two platens of the first alternative of embodiment of the lightning transmission device.

With regard to the first alternative A) of embodiment of the relative displacement means between the two platens, these are shown in FIG. 3, and comprise:

an oblong groove (2a) belonging to the second platen (2), a couple of holes (1a, 1b) belonging to the first platen (1), which are located internally with respect to the projection of the oblong groove (2a) of the second platen (2) on the first platen (1); and wherein a couple of fixations (7) are coupled respectively to the groove (2a) and to the couple of holes (1a, 1b), allowing to modify the relative position between the two platens (1, 2) based on the length of said groove (2a), and the separation between the two holes (1a, 1b).

Furthermore, the first platen (1) shows a tear (1c) configured to allow fixation of said platen (1) with respect to a support (8), which is coupled also to the electrical insulator (6); and the second platen (2) shows a tear (2c) also configured to allow fixation of said platen (2) with respect to the support (8). Where the fixation of the support (8) with respect to the electrical insulator (6) is performed through four fixation screws, viewed in said FIG. 3.

It must be noted that in said alternative A) the electricity conductor means between the first and second platen (2) are the platens (1, 2), as they are in contact with each other thanks to these fixations (7).

Therefore, the procedure for installation of the lightning transmission device of said first alternative is described, comprising the following stages:
a) positioning the first platen (1) at a given distance from the metal strip (4) located at the root of each blade;
b) positioning the second platen (2) at a given distance from the gutter element (5) of said wind turbine;
c) fixing both fixations (7) with respect to both platens (1, 2) through the overlap of the first platen (1) with respect to the second platen (2), through the oblong groove (2a) of the second platen (2) and said pair of holes (1a, 1b) of the first platen (1);
d) fixing, through a first fixation element (14a), the first platen (1) with respect to the support (8) through the corresponding tear (1c) of said first platen (1); and
e) fixing, through a second fixation element (14b), the second platen (2) with respect to the support (8) through the corresponding tear (2c) of said second platen (2).

Figure 4:
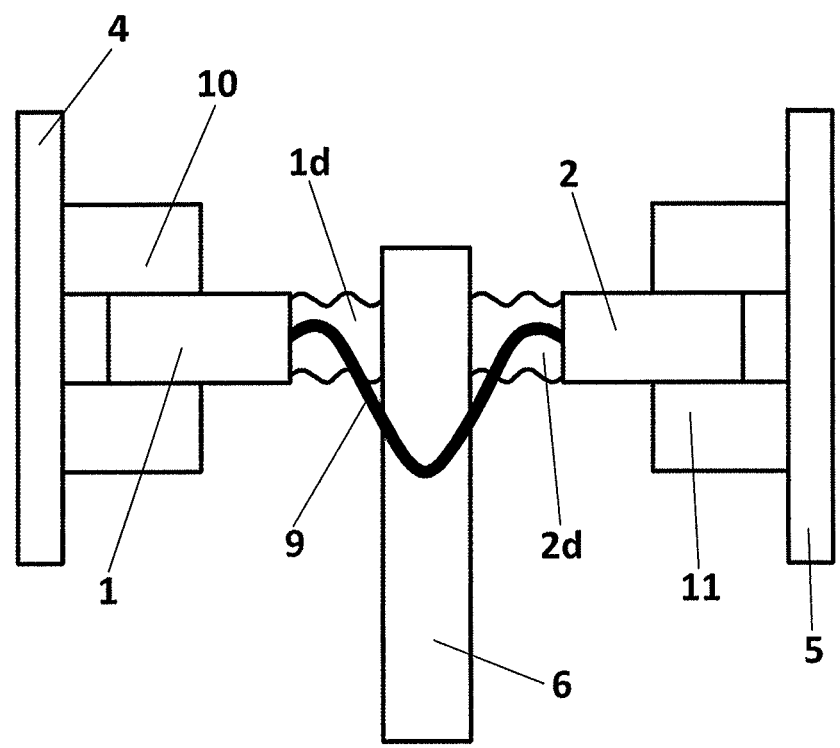
FIG. 4.—Its shows a two dimension view of the lightning transmission device object of the invention, in its second alternative of embodiment with elastic springs.

Then, with regard to the second alternative B) of embodiment of the relative displacement means between the two platens these are seen in FIG. 4 and comprise:
a first elastic spring (1d) coupled on one side to the first platen (1), and on the other side to the insulator (6);
a second elastic spring (2d) coupled on one side to the second platen (2), and on the other side to the insulator (6); wherein both platens (1, 2) show a bar-shaped geometry, with a minimum section of 50 mm$^2$;
an electrical conductor wire (9) coupled both to the first platen (1) and to the second platen (2), which also shows a section of 50 mm$^2$; and
wherein in each end of each platen (1,2) closest to the metal strip (4) and to the gutter (5), respectively, two insulating elements (10, 11) are positioned, configured to contact in this metal strip (4) and the gutter (5), respectively, thanks to the elastic strength of both elastic springs; and said insulating elements (10, 11) being configured to avoid contact between the ends of the platens (1, 2) and the metal strip (4) and the gutter element (5), respectively.

Therefore, the procedure for installation of the lightning transmission device of said second alternative is described, comprising the following stages:
a) fixing an end of the first platen (1) at a predefined distance with one of the insulating elements (10), said end being embedded with respect to the insulating element (10), wherein said fixation is performed by chemical or mechanical means;
b) fixing an end of the second platen (2) at a predefined distance with respect to other of the insulating elements (11), said end being embedded with respect to the insulating element (11), wherein said fixation is performed by chemical or mechanical means;
c) fixing the respective elastic springs (1d, 2d) to each end of each platen (1, 2) opposite the respective insulating elements (10, 11);
d) coupling the elastic springs (1d, 2d) to the electrical insulator (6);
e) joining each platen (1, 2) through the electrical conductor wire (9); and
f) positioning the transmission element between the metal strip (4) of the root of each blade and the gutter element (5) of said wind turbine, until contacting one of the insulating elements (10) with each metal strip (4), and the other insulating element (11) with the gutter element (5), due to the elastic springs (1d, 2d) associated with the platens (1, 2) fixed to each said insulating element (10, 11).

Based on this description and the set of figures, the expert in the art may understand that the embodiments of the invention described can be combined in multiple ways in the object of the invention. The invention has been described according to some preferred embodiments thereof, but for the expert in the art it shall be evident that multiple variations can be entered in said preferred embodiments without exceeding the object of the invention claimed.

The invention claimed is:

1. A lightning transmission device between a rotor and a nacelle in a wind turbine, configured to be installed in the wind turbine of blades turning with respect to a hub, wherein the wind turbine comprises additionally a gutter element, and the transmission device comprising:
   a first electricity conductor platen, where one end of the first platen is separated at a distance from a metal strip placed at a root of each blade;
   a second electricity conductor platen, where one end of the second platen is separated at a distance from the gutter element of said wind turbine;
   electricity conductor means between the first and second platen;
   an electrical insulator coupled to said first and second conductor platens, wherein said insulator is coupled also to the hub of said wind turbine, and
   relative displacement means between the first and second platen, said relative displacement means configured to ensure a predefined distance between the end of the first platen and the metal strip located at the root of each blade; and between the end of the second platen and the gutter element.

2. The lightning transmission device according to claim 1, wherein said relative displacement means between both platens comprise:
   an oblong groove belonging to the second platen,
   at least one hole belonging to the first platen, which is located internally with respect to a projection of the oblong groove of the second platen on the first platen; and wherein at least one fixation is coupled respectively to the groove and the hole, allowing to modify modification of the relative position between the two platens based on the length of said groove.

3. The lightning transmission device according to claim 2, wherein the first platen has a tear configured to enable fixation of said first platen with respect to a support, which is coupled also to the electrical insulator; and the second platen has a tear also configured to allow fixation of said second platen with respect to the support.

4. The lightning transmission device according to claim 2, wherein the electrical conductor means between the first and second platen are the platens, by being in contact with each other due to said at least one fixation.

5. The lightning transmission device according to claim 1, wherein said relative displacement means between both platens comprise:
- a first elastic spring coupled on one side to the first platen, and on the other side to the insulator;
- a second elastic spring coupled on one side to the second platen, and on the other side to the insulator;
- an electrical conductor wire coupled both to the first platen and to the second platen,
- where in each end of each platen closest to the metal strip and to the gutter element, respectively, two insulating elements are positioned, configured to contact in said metal strip and the gutter element, respectively, thanks due to an elastic strength of both elastic springs; and said insulating elements being configured to avoid contact between the ends of the platens and the metal strip and the gutter element, respectively.

6. The lightning transmission device according to claim 1, wherein the electrical insulator is coupled to the hub of the wind turbine through a base that has said relative displacement means between the electrical insulator and the hub V of the wind generator.

7. The lightning transmission device according to claim 6, wherein the base comprises a plurality of oblong grooves configured to allow coupling between said base and the hub through each of fixation means.

8. A procedure of installation of the lightning transmission device according to claim 2, wherein said procedure comprises the following stages:
a) positioning the first platen at a given distance with respect to the metal strip located at the root of each blade;
b) positioning the second platen at a given distance with respect to the gutter element of said wind turbine;
c) fixing, through said at least one fixation, both platens through an overlapping portion of the first platen with respect to the second platen, through the oblong groove of the second platen and said at least one hole of the first platen.

9. Procedure A procedure of installation of the lightning transmission devicedefined in claim 3 wherein said procedure comprises the following stages:
a) positioning the first platen at a given distance with respect to the metal strip located at the root of each blade;
b) positioning the second platen at a given distance with respect to the gutter element of said wind turbine;
c) fixing, through said at least one fixation, both platens through an overlapping portion of the first platen with respect to the second platen, through the oblong groove of the second platen and said at least one hole of the first platen;
d) fixing, through a first fixation element, the first platen with respect to the support through the corresponding tear of said first platen; and
e) fixing, through a second fixation element, the second platen with respect to the support through the corresponding tear of said second platen.

10. A procedure of installation of the lightning transmission device defined in claim 5, wherein said procedure comprises the following stages:
a) fixing an end of the first platen at a predefined distance from one of the insulating elements said end being embedded with respect to the insulating element;
b) fixing an end of the second platen at a predefined distance from other of the insulating elements, said end being embedded with respect to the insulating element;
c) fixing the respective elastic springs to each end of each platen opposite to the respective insulating elements;
d) coupling the elastic springs to the electrical insulator;
e) joining each platen through the electrical conductor wire; and
f) positioning the transmission element between the metal strip of the root of each blade and the gutter element of said wind turbine, until contacting one of the insulating elements with said metal strip, and the other insulating element with the gutter element, due to the elastic springs associated with the platens fixed to each said insulating element.

11. A procedure for regulation in height of the lightning transmission device according to claim 6, wherein said procedure consists of coupling the electrical insulator with respect to the hub of the wind turbine, through said relative displacement means between the two elements the electrical insulator and the hub V of the wind generator.

* * * * *